(12) United States Patent
Domokos et al.

(10) Patent No.: US 9,340,734 B2
(45) Date of Patent: May 17, 2016

(54) FAUJASITE ZEOLITE PREPARATION PROCESS

(75) Inventors: László Domokos, Amsterdam (NL); Wiebe Sjoerd Kijlstra, Amsterdam (NL); Lay Hwa Ong, Amsterdam (NL); Edward Julius Creyghton, Amsterdam (NL)

(73) Assignee: Shell Oil Company, Houston, TX (US)

( * ) Notice: Subject to any disclaimer, the term of this patent is extended or adjusted under 35 U.S.C. 154(b) by 1014 days.

(21) Appl. No.: 13/513,385

(22) PCT Filed: Nov. 30, 2010

(86) PCT No.: PCT/EP2010/068553
§ 371 (c)(1),
(2), (4) Date: Jul. 24, 2012

(87) PCT Pub. No.: WO2011/067258
PCT Pub. Date: Jun. 9, 2011

(65) Prior Publication Data
US 2012/0279901 A1   Nov. 8, 2012

(30) Foreign Application Priority Data
Dec. 3, 2009 (EP) .................... 09177936

(51) Int. Cl.
| | | |
|---|---|---|
| *C01B 39/02* | (2006.01) | |
| *C01B 39/20* | (2006.01) | |
| *C01B 39/24* | (2006.01) | |
| *C10G 47/16* | (2006.01) | |
| *B01J 29/08* | (2006.01) | |
| *B01J 37/10* | (2006.01) | |
| *B01J 23/888* | (2006.01) | |
| *B01J 37/02* | (2006.01) | |
| *B01J 37/06* | (2006.01) | |
| *C10G 47/18* | (2006.01) | |
| *C10G 47/20* | (2006.01) | |

(52) U.S. Cl.
CPC ............ *C10G 47/16* (2013.01); *B01J 23/888* (2013.01); *B01J 29/084* (2013.01); *B01J 37/0201* (2013.01); *B01J 37/0207* (2013.01); *B01J 37/06* (2013.01); *B01J 37/10* (2013.01); *C01B 39/026* (2013.01); *C01B 39/20* (2013.01); *C01B 39/24* (2013.01); *C10G 47/18* (2013.01); *C10G 47/20* (2013.01); *B01J 2029/081* (2013.01); *B01J 2229/126* (2013.01); *B01J 2229/16* (2013.01); *B01J 2229/36* (2013.01); *B01J 2229/37* (2013.01); *B01J 2229/42* (2013.01)

(58) Field of Classification Search
CPC ....... C01B 29/24; C01B 39/026; C01B 29/20; C10G 47/16; C10G 47/18; C10G 47/20; B01J 23/888; B01J 2029/081; B01J 29/084; B01J 37/0201; B01J 37/0207; B01J 37/06; B01J 37/10; B01J 2229/16; B01J 2229/36; B01J 2229/37; B01J 2229/42
See application file for complete search history.

(56) References Cited

U.S. PATENT DOCUMENTS

| | | | |
|---|---|---|---|
| 3,130,007 A | 4/1964 | Breck | 23/113 |
| 5,013,699 A | 5/1991 | Vassilakis et al. | 502/73 |
| 5,208,197 A | 5/1993 | Vassilakis et al. | 502/67 |
| 7,192,900 B2 * | 3/2007 | Creyghton | B01J 29/084 208/111.01 |
| 7,611,689 B2 * | 11/2009 | Creyghton | C10G 47/02 423/700 |
| 2004/0141911 A1 * | 7/2004 | Cooper | B01J 20/186 423/713 |
| 2004/0152587 A1 | 8/2004 | Creyghton et al. | 502/64 |

FOREIGN PATENT DOCUMENTS

| | | | |
|---|---|---|---|
| EP | 310164 | 4/1989 | ............ C10G 47/02 |
| EP | 310165 | 4/1989 | ............ C10G 47/02 |
| EP | 428224 | 5/1991 | ............ C10G 65/10 |
| WO | WO9932582 | 7/1999 | ............ C10G 65/10 |
| WO | WO2006032698 | 3/2006 | ............ B01J 29/08 |

* cited by examiner

*Primary Examiner* — David M Brunsman
(74) *Attorney, Agent, or Firm* — Charles W. Stewart

(57) ABSTRACT

Disclosed is a process for the preparation of a faujasite zeolite. A starting zeolite of the faujasite structure having a silica to alumina ratio of from 4.5 to 6.5 and an alkali level of less than 1.5% wt is steam calcined to produce an intermediate zeolite. The intermediate zeolite is treated with an acidified solution having specificately defined characteristics.

20 Claims, No Drawings

FAUJASITE ZEOLITE PREPARATION PROCESS

PRIORITY CLAIM

The present application claims priority from PCT/EP2010/068553, filed 30 Nov. 2010, which claims priority from EP 09177936.3, filed 3 Dec. 2009.

The present invention relates to the preparation of specific faujasite zeolites, hydrocracking catalyst compositions comprising faujasite zeolite and their use.

Hydroconversion processes are important in the modern world in providing important basic fuels for everyday life. As it becomes of an increasing necessity to utilize heavier crude oil feedstocks, the oil refining industry has turned to hydrocracking processes to provide the lighter basic fuels which modern society demands. Modern hydrocracking catalysts are often based on zeolitic materials.

Faujasite materials are one of the main zeolitic materials proposed for hydrocracking use. Early findings showed that modification of the basic materials described in U.S. Pat. No. 3,130,007 to produce a lowering of the unit cell size, gave improved selectivity to the desired middle distillate, or mid-barrel, products. To achieve this, various combinations of steam calcination and dealumination, usually acid-dealumination, techniques have been proposed.

However in certain regions, eg North America, lighter liquid products are more in demand. Such products are called the naphtha fractions, with heavy naphtha (the fraction boiling from 82° C. to 191° C.) being particularly desirable. Faujasites having a unit cell size of 24.40 Å or more are known to be more naphtha-selective than those with a lower unit cell size. The latter are more commonly used in middle distillate-selective catalysts.

WO-A-2006/032698 discloses faujasite based naphtha-selective catalysts having a high activity and good naphtha-selectivity which catalysts comprise faujasite having a unit cell size in the range of from 24.40 to 24.50 Å, a bulk silica to alumina molar ratio in the range of from 5 to 10, an alkali metal content of less than 0.15% wt and a surface area in the range of from 650 to 900 m$^2$/g. It is mentioned that an increase in surface area does not improve the activity of these catalysts. Further, an increase in silica to alumina molar ratio increases the selectivity to light naphtha but reduces the yield of heavy naphtha.

US-A-2004/0152587 and US-A-2004/0141911 describe faujasite containing catalysts which faujasite has a unit cell size in the range of from 24.10 to 24.40 Å, a bulk silica to alumina molar ratio which preferably is at least 20 and a surface area which preferably is at least 875 m$^2$/g. This faujasite is obtained by hydrothermally treating starting zeolite at a temperature of from 600 to 850° C. in 90 to 100% by volume of steam.

U.S. Pat. No. 5,013,699 describes a process for preparing zeolite Y for use in hydrocracking catalysts which zeolite Y has a unit cell size of 24.34-24.58 Å, a bulk silica to alumina molar ratio in the range of from 8.0 to 18.0, a residual soda content of 0.15% wt and a surface area of greater than 735 m$^2$/g. The zeolite Y is prepared by hydrothermal treatment followed by low pH ammonium ion exchange of a previously ammonium ion exchanged sodium Y zeolite. The hydrothermal treatment is to be carried out by exposing the ammonium exchanged zeolite Y to 100% steam at a temperature of from 550 to 850° C., preferentially of from about 600 to about 725° C. for 1 hour.

It has now surprisingly been found the activity and the selectivity to heavy naphtha of faujasite based catalysts can be further improved by applying a relatively mild steam calcination.

Therefore, the present invention relates to a process for the preparation of faujasite zeolite having a unit cell size in the range of from 24.42 to 24.52 Å; a bulk silica to alumina molar ratio (SAR) in the range of from 10 to 15; and a surface area of from 910 to 1020 m$^2$/g which process comprises a) providing a starting zeolite of the faujasite structure having a silica to alumina ratio of from 4.5 to 6.5 and an alkali level of less than 1.5% wt;

b) steam calcination by treating said starting zeolite at a temperature in the range of from 550 to 750° C. and at a partial pressure of steam in the range of from 5 to 50 vol %, basis total gas present, for a time effective to produce an intermediate zeolite having a unit cell size of from 24.40 to 24.50 Å;

c) contacting the intermediate zeolite with an acidified solution comprising of from 4 to 9 mmole of acid having a pKa below 0 per gram of zeolite and optionally an ammonium salt under conditions effective to produce a zeolite having a unit cell size in the range of from 24.42 Å to 24.52 Å; a SAR in the range of from 10 to 15; and a surface area of from 910 to 1020 m$^2$/g; and d) recovering said zeolite.

Without wishing to be bound to any theory, it is thought that the mild steaming conditions prevent clustering and make it possible to remove the majority of the extra framework alumina in the subsequent deep leaching step while leaving the crystalline structure intact as can be derived from the fact that the unit cell size tends to be similar before and after the leaching step. Steaming at higher water partial pressure and/or higher temperature seems to make it impossible to selectively leach extra framework aluminium in the subsequent step. The zeolite of the present invention is highly crystalline while only containing a very limited amount of extra framework alumina. Such zeolite has physical and chemical properties which are advantageous for various applications including but not limited to its use in a naphtha-selective hydrocracking catalyst.

The unit cell size of the faujasite zeolite prepared according to the present invention, preferably being a zeolite Y, is in the range of from 24.42 to 24.52 Å, preferably of from 24.42 to 24.50 Å. More preferably, the unit cell size is of from 24.43 to 24.49 Å. The bulk silica to alumina molar ratio (herein also termed "SAR") of the zeolite is at least 10, preferably above 10, preferably at least 10.2, more preferably at least 10.3, most preferably at least 10.5. The upper limit of the SAR is 15, preferably at most 14, more preferably at most 13, especially at most 12.5, most preferably at most 12. The surface area of the zeolite is preferably at least 920 m$^2$/g, more preferably at least 950 m$^2$/g. Generally, the surface area will be at most 1010 m$^2$/g, more specifically at most 1000 m$^2$/g. A high surface area is advantageous in that it means that there is a large surface area available for catalysis.

The zeolite preferably has an alkali level of less than 0.15% wt based on the zeolite, more preferably less than 0.10% wt. The zeolite desirably has as low an alkali level as possible.

The silica to alumina molar ratio of the faujasite zeolite of the invention is the bulk or overall ratio. This can be determined by any one of a number of chemical analysis techniques. Such techniques include X-ray fluorescence, atomic adsorption, and ICP (inductive coupled plasma). All will provide substantially the same bulk ratio value.

The unit cell size for a faujasite zeolite is a common property and is assessable to an accuracy of ±0.01 Å by standard techniques. The most common measurement technique is by X-ray diffraction (XRD) following the method of ASTM D3942-80.

Surface area is determined in accordance with the well known BET (Brunauer-Emmett-Teller) nitrogen adsorption technique, often simply termed the BET method. Herein also the general procedure and guidance of ASTM D4365-95 is followed in the application of the BET method to zeolite Y materials. To ensure a consistent state of the sample to be measured, specifically all samples undergo a pretreatment. Specifically the pretreatment involves heating the sample, for example to a temperature of 400 to 500° C., for a time sufficient to eliminate free water, eg 3 to 5 hours. The nitrogen porosimetry measurements utilised in the surface area (BET) determination, can also be used to determine other properties such as mesopore (pores having a diameter of 2 nm or more) area. For the zeolites of the present invention, the mesopore area is generally in excess of 50 m$^2$/g.

All of the above measurement and determination procedures are well known to those skilled in the art.

The present invention relates to the preparation of zeolites by a combination of mild steaming with deep leaching.

The low alkali level starting material may be prepared by techniques well known in the art, for example by re-iterative ammonium ion exchange of higher alkali metal containing zeolite until the desired alkali metal level is achieved, such as is described in U.S. Pat. No. 4,085,069, or via the potassium ion exchange technique disclosed in U.S. Pat. No. 5,435,987 and International Patent Specification No. WO 95/03248. The starting zeolites most specifically have a unit cell size in the range of from 24.60 to 24.74 Å.

While an aspect of the starting zeolites is the low alkali level, a more critical aspect of the starting zeolites is believed to be their SAR, which is preferably in the range of from 5.4 to 6.5.

Regarding the term alkali and alkali metal, both are used herein interchangeably. Both terms are generally used to indicate alkali metal oxide, for example sodium oxide and/or potassium oxide. The amount is easily determined by, for example, XRF—a quick chemical analysis technique. Most specifically about 1 wt % or less alkali oxide is present in the starting zeolite.

Step b) is a steam calcination step. Such treatment is common in the art and may alternatively be called a hydrothermal treatment. The treatment covers heating in the presence of steam. The steam partial pressure for step b) is to be in the range of from 5% vol steam to 50% vol steam, basis total gas present. Generally, steaming is carried out at atmospheric pressure. In such case, 5 to 50% vol steam equals a steam partial pressure of from 0.05 to 0.5 atmosphere. The steam may be generated solely by the internal moisture from the starting zeolite, so-called self-steaming, provided that this provides the amount of steam required. However, it is preferred to supply external steam to ensure consistency of the reaction conditions for the entire duration of the steam calcination step. The amount of steam specifically is at most 45% vol, more specifically at most 40% vol, more specifically at most 35% vol and most specifically at most 30% vol partial pressure of steam basis total gas present. Other gas which can be present may be air, nitrogen or other inert gas. The amount of steam preferably is at least 8% vol, more specifically at least 10% vol, more specifically at least 12% vol and most specifically at least 15% vol partial pressure of steam basis total gas present.

To prepare zeolites of use in the present invention, it is useful for the steam calcination to be carried out at a temperature in the range of from 550 to 750° C., and preferably from 600 to 700° C., more preferably 610 to 660° C. Whatever heating regime is used, care must be taken to ensure that hot spots do not occur in the treatment vessel as this will yield zeolites of uneven properties. The steaming is most usefully carried out for a time in the range of from 0.5 hours to 5 hours, preferably from 0.5 to 3 hours.

The best combination of steaming conditions for the equipment and materials used, can be routinely experimentally determined. Desirably the SAR of the zeolite changes little in the steaming process such as less than 20%, more specifically less than 10%.

Preferably, the zeolite obtained in step b) is treated with an ammonium salt containing aqueous solution before being contacted with the acidified solution of step c). Useful ammonium salt containing aqueous solutions may comprise of from 2 to 40 mmole $NH_4^+$ per g of zeolite, more specifically of from 3 to 30, most specifically of from 3 to 20 mmole $NH_4^+$ per g of zeolite. The mixture of zeolite and ammonium salt containing aqueous solution preferably contains of from 5 to 40% wt of zeolite, calculated as weight amount of zeolite on amount of zeolite and solution, more specifically of from 10 to 25% wt, most specifically of from 15 to 20% wt.

Any ammonium salt may conveniently be used, such as ammonium nitrate, ammonium chloride and/or ammonium sulphate. Preferably the ammonium salt used is selected from ammonium chloride and ammonium nitrate. The temperature of this ammonium treatment generally is in the range of from ambient temperature, for example 20° C., to 100° C., more specifically in the range of from 40 to 80° C. The treatment is generally carried out for at least 5 minutes, more specifically of from 10 minutes up to 3 hours, most specifically of from 15 minutes up to 2 hours. The preferred sequence for adding water, ammonium salt and zeolite of step b), depends on further circumstances. In some instances, it is preferred to add zeolite to the ammonium containing solution. In many circumstances, it is preferred to add ammonium salt and zeolite to water.

Step c) may be carried out at a temperature in the range of from ambient temperature, for example 20° C., to 100° C. Preferably an elevated temperature is used, most specifically in the range of from 40 to 80° C., for example from 60 to 80° C. The temperature used can vary from laboratory scale (where a batch treatment is usual) to the commercial scale (where continuous treatment is normal); in the latter the dealumination time may vary dependent on throughflow of material in the treatment vessel.

The correct concentration of acid solution is to be used to achieve the desired materials. The most useful materials are prepared using a relatively high acid dosage in the range of from 4 to 9 mmole of acid having a pKa below 0 per gram of zeolite. The amount of acid preferably is at least 4.5, more preferably at least 5, most preferably at least 5.5 mmole of acid per gram of zeolite. The amount of acid having a pKa below 0 preferably is at most 8 mmole of acid per gram of zeolite. The acid applied in step c) generally are inorganic acids such as hydrochloric acid, nitric acid and/or sulphuric acid. Preferably, a monovalent acid such as hydrochloric acid and/or nitric acid is used. Most preferably, hydrochloric acid is used. If hydrochloric acid is used, it is preferred that the amount is of from 0.16 to 0.30 g HCl per g of zeolite, more preferably at least 0.18, more preferably at least 0.20, most preferably at least 0.21 g HCl per g of zeolite. Usefully the acid is used in the form of an aqueous solution. Preferably, the pH of the acidified solution is at most 4, more specifically at most 3, more specifically at most 2, more specifically at most 1, most specifically of from −0.2 to 0.5.

Both step b) and c) are to be carried such as to obtain zeolite having a unit cell size in the specified range. Someone skilled in the art will know which conditions to apply in order to obtain zeolite having the desired unit cell size. If the steam/leach treatment is carried out well, the unit cell size of the zeolite will in many instances not change during the leaching of step c) while the SAR will increase.

The leaching of step c) can be carried out with the help of an acidified solution further containing an ammonium salt. The kind of salt has been described above for treating the product of step b). The concentration of ammonium salt, when used, is not critical. Useful ammonium salt containing acidified solutions may comprise of from 2 to 40 mmole $NH_4^+$ per g of zeolite, more specifically of from 3 to 30, most specifically of from 3 to 20, mmole $NH_4^+$ per g of zeolite. The mixture of zeolite and acidified solution preferably contains of from 5 to 40% wt of zeolite, calculated as weight amount of zeolite on amount of zeolite and solution, more specifically of from 10 to 25% wt, most specifically of from 15 to 20% wt.

It is possible to perform either a single step or a multi-step dealumination in order to preserve the crystallinity of the zeolite treated but also to ensure, where necessary, that a mild acid treatment is performed in each step. Most conveniently each step is carried out using the same dealuminant materials and under the same reaction conditions.

The leaching time generally will be in the range of from 2 minutes to 2 hours, more specifically of from 3 minutes to 1.5 hours, more specifically of from 5 minutes up to 1 hour. Naturally the higher the concentration of acid and optional ammonium salt used, the shorter the treatment time. The timescale can of course vary from laboratory scale to commercial scale.

The leaching preferably is actively stopped to prevent uncontrolled leaching due to the high acid concentration. The leaching can be stopped by removing the zeolite from the solution. Alternatively, water is added to the zeolite containing solution for diluting the acid. Preferably, cold water is added to the leaching solution to dilute the acid and at the same time lower the temperature. Subsequently, the zeolite is separated off for example by filtration. Filtration can be carried out in any way known to someone skilled in the art. A method which has been found to be especially suitable is vacuum belt filtration. Preferably, the zeolite separated off is washed with water during or after filtration.

The zeolite obtained in step c) preferably is treated once more with an ammonium salt containing aqueous solution, and subsequently washed and dried. Washing can be carried out in any way known to someone skilled in the art to remove to remove residual ammonium salt. It depends on the circumstances whether drying is required. Useful ammonium salt containing aqueous solutions may comprise of from 2 to 40 mmole $NH_4^+$ per g of zeolite, more specifically of from 3 to 30, most specifically of from 3 to 20 mmole $NH_4^+$ per g of zeolite. The mixture of zeolite and ammonium salt containing aqueous solution preferably contains of from 5 to 40% wt of zeolite, calculated as weight amount of zeolite on amount of zeolite and solution, more specifically of from 10 to 25% wt, most specifically of from 15 to 20% wt. The kind of salt has been described above for treating the product of step b). The temperature of this ammonium treatment generally is in the range of from ambient temperature, for example 20° C., to 100° C., more specifically in the range of from 40 to 80° C. The treatment is generally carried out for at least 10 minutes, more specifically of from 20 minutes up to 5 hours, most specifically of from 30 minutes up to 3 hours.

The present invention further relates to a process for preparing a hydrocracking catalyst carrier composition, more specifically a carrier for a naphtha-selective hydrocracking catalyst, which process comprises (i) preparing a faujasite zeolite by a process according to the present invention, and (ii) mixing the zeolite with amorphous binder component, and to a process for preparing a hydrocracking catalyst composition, more specifically a naphtha-selective hydrocracking catalyst, which process comprises preparing a catalyst carrier composition according to the present invention and further (iii) incorporating at least one hydrogenation component into the catalyst carrier composition. The present invention further relates to a process for converting a hydrocarbonaceous feedstock into lower boiling materials, which comprises contacting the feedstock at elevated temperature and pressure with the catalyst composition prepared according to the present invention.

The amorphous binder component may be any refractory inorganic oxide or mixture of oxides conventional for such compositions. Generally this is an alumina, a silica, a silica-alumina or a mixture of two or more thereof. However it is also possible to use zirconia, clays, aluminium phosphate, magnesia, titania, silica-zirconia and silica-boria, though these are not often used in the art. The amount of zeolite in the catalyst when binder is also present may be up to 90% by weight, but is preferably in the range of from 2, more preferably 20, especially 50, to 80% by weight, based on the total catalyst.

It should be noted that amorphous silica alumina may act both as a second cracking component and as a binder. As a cracking component it is most usefully employed in high operating temperature processes; as a binder it has been found useful in protecting a zeolite from loss of crystallinity, and therefore deactivation, in use in any process that water and/or fluoride is present or generated.

Amorphous silica alumina materials may usefully contain silica in an amount in the range of from 25 to 95 wt %, most preferably at least 40 wt %. Most preferred, however, as a binder is alumina, particularly boehmite, pseudoboehmite, and gamma alumina.

In the preparation of the catalyst of the invention, following the mixing of zeolite with binder, an acidic aqueous solution may be added to the mixture after which it is co-mulled, extruded and calcined in conventional manner. Any convenient mono-basic acid may be used for the acidic solution; examples are nitric acid and acetic acid. During extrusion, conventionally extrusion aids are utilized; usual extrusion aids include Methocel and Superfloc.

Extrusion may be effected using any conventional, commercially available extruder. In particular, a screw-type extruding machine may be used to force the mixture through orifices in a die plate to yield catalyst extrudates of the required form, e.g. cylindrical or trilobed. The strands formed on extrusion may then be cut to the appropriate length, for example 1.6, 2.5, 2.8 mm. If desired, the catalyst extrudates may be dried, e.g. at a temperature of from 100 to 300° C. for a period of 10 minutes to 3 hours, prior to calcination.

Calcination is conveniently carried out in air at a temperature in the range of from 300 to 850° C. for a period of from 30 minutes to 4 hours.

At least one hydrogenation component is preferably incorporated into the catalyst of the invention. This addition may occur at any stage during catalyst preparation, using techniques conventional in the art. For example, the hydrogenation component can be added to the zeolite, or a mixture of zeolite and binder, through co-mulling.

It has been found for zeolite Y-containing catalysts in which the zeolite Y has a unit cell size above 24.42 Å, that the temperature of calcination can affect the activity and selectivity of the catalyst. Catalysts calcined at high temperatures can demonstrate an increased activity of as much as 3 to 5° C. (where activity is demonstrated by the temperature required to obtain a specific conversion of feed), and an increased selectivity of 0.5 to 2 wt % for light and heavy naphtha product. This effect is particularly enhanced for catalysts prepared via co-mulling, whether by co-mulling of zeolite and binder only, or of zeolite and binder together with one or more hydrogenation metal salts.

Therefore, preferably the calcination temperature used is in the range of from 600 to 850° C. More preferably, the calcination temperature is in the range of from 650 to 820° C., and it is especially preferred in the range of from 700 to 750° C.

The time taken for the calcination is not usually critical.

Alternatively the hydrogenation component may be added to the formed extrudates either before or after calcining, using conventional impregnation techniques, eg as one or more aqueous impregnating solutions of Group VIB and/or Group VIII metal salts. If the impregnation occurs after calcination of the formed extrudates, then a further drying and calcination procedure is usefully employed.

Suitable metals salts for both co-mulling and impregnation preparation routes are acetates, carbonates, nitrates and ammonium salts, such as nickel acetate, nickel nitrate, nickel carbonate, and ammonium metatungstate, as are well known to those skilled in the art. For environmental reasons nitrate and carbonate salt solutions are preferred over the use of acetate solutions.

Herein reference is made to the Periodic Table of Elements which appears on the inside cover of the CRC Handbook of Chemistry and Physics ('The Rubber Handbook'), 66$^{th}$ edition and using the CAS version notation.

Specifically the hydrogenation component is selected from nickel, cobalt, molybdenum, tungsten, platinum and palladium.

Examples of hydrogenation components that may thus specifically be used include Group VIB (e.g. molybdenum and tungsten) and Group VIII metals (e.g. cobalt, nickel, iridium, platinum and palladium), their oxides and sulphides. The catalyst composition will preferably contain at least two hydrogenation components, e.g. a molybdenum and/or tungsten component in combination with a cobalt and/or nickel component. Particularly preferred combinations are nickel/tungsten and nickel/molybdenum. Very advantageous results are obtained when these metal combinations are used in the sulphide form.

The present catalyst composition may contain up to 50 parts by weight of hydrogenation component, calculated as metal per 100 parts by weight (dry weight) of total catalyst composition. The catalyst composition may contain from 5 to 30, especially 5 to 10 parts by weight of Group VIB metal(s) and/or from 0.05 to 10, more preferably from 1 to 5, parts by weight of Group VIII metal(s), calculated as metal per 100 parts by weight (dry weight) of total catalyst composition.

Typical properties for a catalyst of the invention include a water pore volume in the range of from 0.6 to 0.75 cc/g and a flat plate (FP) crush strength of in excess of 3.5 lb/mm, preferably at least 5, more preferably in the range of from 5 to 7. Typical catalysts may have an average particle length of from 4 to 6 nm. Typically also a catalyst of the present invention has a compacted bulk density (CBD) of at least 0.50 g/cc, preferably at least 0.58; at most the CBD is specifically 0.65 g/cc. Herein CBD is assessed following the method of ASTM D 4180-03.

The catalyst composition finds especially application as a naphtha-selective catalyst composition. Thus, the present invention also provides a process for converting a hydrocarbonaceous feedstock into lower boiling materials which comprises contacting the feedstock with hydrogen at elevated temperature and elevated pressure in the presence of a catalyst composition according to the present invention.

Examples of such processes comprise single-stage hydrocracking, two-stage hydrocracking, and series-flow hydrocracking. Definitions of these processes can be found in pages 602 and 603 of Chapter 15 (entitled "Hydrocarbon processing with zeolites") of "Introduction to zeolite science and practice" edited by van Bekkum, Flanigen, Jansen; published by Elsevier, 1991.

It will be appreciated that the hydroconversion processes of the present invention can be carried out in any reaction vessel usual in the art. Thus the process may be performed in a fixed bed or moving bed reactor. Also the catalyst of the invention may be used in conjunction with any suitable co-catalyst or other materials usual in the art. Thus for example the catalyst of the invention may be used in stacked bed formation with one or more other catalysts useful in hydroprocessing, for example with a catalyst containing a different zeolite, with a catalyst containing a faujasite zeolite of different unit cell size, most preferably a unit cell size of greater than 24.40 Å, with a catalyst utilizing an amorphous carrier, and so on. Various stacked bed combinations have been proposed in the literature: WO-99/32582; EP-A-310,164; EP-A-310,165; and EP-A-428,224 may, for example, be mentioned.

The hydrocarbonaceous feedstock useful in the present process can vary within a wide boiling range. They include atmospheric gas oils, coker gas oils, vacuum gas oils, deasphalted oils, waxes obtained from a Fischer-Tropsch synthesis process, long and short residues, catalytically cracked cycle oils, thermally or catalytically cracked gas oils, and syncrudes, optionally originating from tar sand, shale oils, residue upgrading processes and biomass. Combinations of various hydrocarbon oils may also be employed. Typically, though, the feedstocks most suited for the process of the invention are the lighter feedstocks or fractions obtained by treatment of a feedstock through cracking or fractionation. Such feedstocks include atmospheric and vacuum gas oils, gas oils formed by cracking processes, cycle oils, and similar boiling range feedstocks. The boiling range will generally be of the order of from about 90 to 650° C. The feedstock may have a nitrogen content of up to 5000 ppmw (parts per million by weight) and a sulphur content of up to 6 wt %. Typically, nitrogen contents are in the range from 10, eg from 100, to 4000 ppmw, and sulphur contents are in the range from 0.01, eg from 2, to 5 wt %. It is possible and may sometimes be desirable to subject part or all of the feedstock to a pretreatment, for example, hydrodenitrogenation, hydrodesulphurisation or hydrodemetallisation, methods for which are known in the art.

The process of the invention may conveniently be carried out at a reaction temperature in the range of from 250 to 500° C.

The present process is preferably carried out at a total pressure (at the reactor inlet) in the range of from $3 \times 10^6$ to $3 \times 10^7$ Pa, more preferably from $8 \times 10^6$ to $2.0 \times 10^7$ Pa. Where a hydrocracking process is carried out at a low pressure of, for example, up to $1.2 \times 10^7$ Pa this may be termed 'mild hydrocracking'.

The hydrogen partial pressure (at the reactor inlet) is preferably in the range from $3 \times 10^6$ to $2.9 \times 10^7$ Pa, more preferably from $8 \times 10^6$ to $1.75 \times 10^7$ Pa.

A space velocity in the range from 0.1 to 10 kg feedstock per liter catalyst per hour (kg.l$^{-1}$.h$^{-1}$) is conveniently used.

Preferably the space velocity is in the range from 0.1 to 8, particularly from 0.2 to 5 kg.l$^{-1}$.h$^{-1}$.

The ratio of hydrogen gas to feedstock (total gas rate) used in the present process will generally be in the range from 100 to 5000 Nl/kg, but is preferably in the range from 200 to 3000 Nl/kg.

The present invention will now be illustrated by the following Examples.

EXAMPLES

In the Examples the following test methods have been used:

Unit cell size: Determined by X-ray diffraction using the method of ASTM D-3942-80.

Surface Area: Determined in accordance with the conventional BET (Brunauer-Emmett-Teller) method nitrogen adsorption technique as described in the literature at S. Brunauer, P. Emmett and E. Teller, J. Am. Chm. Soc., 60, 309 (1938), and ASTM method D4365-95. In the determinations quoted below, the results are given as a single point assessment taken at a nitrogen partial pressure of 0.03 following a high temperature pretreatment.

Silica to alumina molar ratio (SAR): Determined by chemical analysis; values quoted are 'bulk' SAR (that is to say the overall SAR) and not specifically the SAR of the crystalline framework.

Example 1

Zeolite Preparation

Faujasite zeolite of SAR 5.6, unit cell size 24.64 Å, 12.40 wt % sodium oxide, ex-Zeolyst International, was converted into a low alkali (less than 1.5 wt % alkali oxide) ammonium form Y zeolite using the technique described in U.S. Pat. No. 5,435,987 which involves K$^+$ ion exchange of the sodium form zeolite Y, followed by ammonium ion exchange. The resulting zeolite was of unit cell size 24.70 Å, SAR 5.6, potassium oxide content 0.45 wt %, and sodium oxide content 0.35 wt %.

This low alkali ammonium form zeolite Y was then steam calcined for 2 hours at a temperature of 630° C. in 20 vol % steam in a rotary kiln to provide a zeolite having a unit cell size 24.46 Å and SAR of 5.6. The steamed zeolite was then slurried with an aqueous ammonium chloride containing solution (0.40 kg NH$_4$Cl/kg of dry zeolite) at a temperature of 60° C. and was kept at that temperature during 45 minutes. The slurry contained 18.5% wt of zeolite. Subsequently, hydrogen chloride was added to the slurry (0.24 kg hydrogen chloride/kg of dry zeolite). The temperature was kept at 70° C. during 15 minutes. The slurry was then transferred to another tank, diluted with cold water and filtered over a vacuum belt filter. On the belt, the leached zeolite was washed with warm water. The zeolite coming from the belt was reslurried with an aqueous ammonium chloride containing solution (0.50 kg NH$_4$Cl/kg of dry zeolite) at a temperature of 60° C. and was kept at that temperature during 1.5 hours minutes. The slurry contained 18.5% wt of zeolite. Finally, the zeolite was washed with water and dried.

The final zeolite was of unit cell size 24.49 Å, SAR 11.5 and a surface area of 950 m$^2$/g.

Example 2

Zeolite Preparation

Zeolite was prepared as described in Example 1 with the exception that 0.20 kg hydrogen chloride/kg of dry zeolite was added during leaching. The final zeolite was of unit cell size 24.49 Å, SAR 10.5 and a surface area of 940 m$^2$/g.

Example 3

Zeolite Preparation (Comparative)

Faujasite zeolite of SAR 5.2, unit cell size 24.64 Å, 12.99% wt sodium oxide, ex-Zeolyst International, was converted into a low alkali (less than 1.5 wt % alkali oxide) ammonium form Y zeolite using the technique described in U.S. Pat. No. 5,435,987 which involves K ion exchange of the sodium form zeolite Y, followed by ammonium ion exchange.

This low alkali ammonium form zeolite Y was then steam calcined for 45 minutes at a temperature of 630° C. in 100 vol % steam in a rotary kiln. The steamed zeolite was then subjected to an acid-dealumination treatment as a one-step treatment with an aqueous solution of hydrochloric acid in an amount of 0.05 g HCl/g zeolite for at least 1 hour at 60° C.

The final zeolite was of unit cell size 24.50 Å, SAR 8.25 and a surface area of 865 m$^2$/g.

Example 4

Catalyst Preparation

The zeolite Y prepared in Examples 1, 2 and 3, respectively, were loaded into a muller at low speed and mixed with a metals solution for five minutes following which alumina (WPA alumina ex Criterion Catalysts & Technologies) in an amount sufficient to provide a weight ratio of zeolite to alumina, dry basis, of 80:20, and Methocel K-15MS in an amount of 1.8 wt % basis total dry solids, was added and the whole mixed at high speed for 1 to 2 minutes. The metals solution was an aqueous solution of a nickel nitrate solution (14.4 wt % nickel) and an ammonium metatungstate solution (73 wt % tungsten); the overall metals solution contained 6.3 wt % nickel and 20.5 wt % tungsten and had a pH in the range of 2.0 to 2.4.

Deionised water to achieve a loss on ignition in the product of 50% and nitric acid (2 wt % total dry solids) to peptise the alumina was then added and mixing continued at high speed until the colour of the mix changed to a darker green and large lumps appeared in the mix from agglomeration of the materials. Superfloc, in an amount of 1.0 wt %, basis total dry solids, was then added and the whole mixed for a further 3 to 5 minutes until an extrudable mix was formed. The mix was then extruded in a screw extruder to obtain extrudates having the form of 1.6 mm diameter cylinders. The extrudates were dried in a rotating drum at a temperature not exceeding 130° C. for about 90 minutes, and then calcined at 730° C. for about 2 hours.

The final catalysts had the following composition: 3.3 wt % as nickel oxide (2.6 wt % nickel); 10.6 wt % as tungsten oxide (8.4 wt % tungsten); 68.9 wt % zeolite Y; and 17.2 wt % alumina binder, all basis total catalyst.

Example 5

Activity Testing

The hydrocracking performance was assessed of the catalysts prepared according to Example 4.

The testing was carried out in once-through microflow equipment which had been loaded with a catalyst bed comprising 15 ml of the test catalyst diluted with 15 ml of 0.1 mm SiC particles. The catalyst bed was presulphided prior to testing.

Each test involved the sequential contact of a hydrocarbonaceous feedstock with the catalyst bed in a once-through operation during about one month under the following process conditions: a space velocity of 1.3 kg feed oil per 1 catalyst per hour (kg.l$^{-1}$.h$^{-1}$), a hydrogen gas/feed oil ratio of 1000 Nl/kg, and a total pressure of 9,600 kPa (96 bar) at the inlet.

The test feedstock used had the following properties:

| | | |
|---|---|---|
| Carbon content | 87.03 | wt % |
| Hydrogen content | 12.95 | wt % |
| Sulphur content | 0.024 | wt % |
| Nitrogen (N) content | 13 | ppmw |
| Added n-Decylamine (to achieve 150 ppmv NH$_3$) | 0.91 | g/kg |
| Added sulphur Sulfrzol54 (to achieve 2500 ppmv H$_2$S) | 6.21 | g/kg |
| Density (15/4° C.) | 0.8719 | g/ml |
| Initial boiling point | 162° | C. |
| 50% w boiling point | 308° | C. |
| Final boiling point | 533° | C. |
| Fraction boiling below 370° C. | 18.40 | wt % |
| Fraction boiling below 191° C. | 3.13 | wt % |

The results are shown in Table 1 below. Catalyst 1 contains zeolite Y prepared as described in Example 1, Catalyst 2 contains zeolite Y prepared as described in Example 2 and Comparative Catalyst 3 comprises zeolite Y prepared as described in comparative Example 3.

For Catalyst 1, Catalyst 2 and Comparative Catalyst 3, the same catalyst preparation method, metals loading, and zeolite/binder contents were followed, and all catalysts were tested and assessed by the same procedure as mentioned above.

The hydrogen consumption in all cases was approximately 2.2 wt %.

The k(360) is the first order reaction (cracking) rate constant determined at 360° C.

The E-factor is yield ratio (% wt/% wt) of heavy naphtha (82-191° C.) to compounds containing of from 1 to 4 carbon atoms, and is a measure for the selectivity. It was assessed at 70% wt conversion of feed components boiling above 191° C.

From the results it can be seen that the catalysts according to the present invention have both a better activity and a better selectivity.

TABLE 1

| Catalyst | Unit[1] cell size (Å) | SAR[1] | Surface[1] area (m$^2$/g) | k(360) | E-factor |
|---|---|---|---|---|---|
| Catalyst 1 | 24.49 | 11.5 | 950 | 1.68 | 5.02 |
| Catalyst 2 | 24.49 | 10.5 | 940 | 1.55 | 4.85 |
| Comparative Catalyst 3 | 24.50 | 8.2 | 865 | 1.30 | 4.40 |

[1]properties of the zeolite

What is claimed is:

1. A process for the preparation of a zeolite having a unit cell size in the range of from 24.42 to 24.52 Å; a bulk silica to alumina molar ratio (SAR) in the range of from 10 to 15; and a surface area of from 910 to 1020 m$^2$/g, which process comprises:
   a) providing a starting zeolite of the faujasite structure having a silica to alumina ratio of from 4.5 to 6.5 and an alkali level of less than 1.5% wt;
   b) steam calcination by treating said starting zeolite at a temperature in the range of from 550 to 750° C. and at a partial pressure of steam in the range of from 5 to 50 vol %, basis total gas present, for a time effective to produce an intermediate zeolite having a unit cell size of from 24.40 to 24.50 Å;
   c) contacting the intermediate zeolite with an acidified solution comprising of from 4 to 9 mmole of acid having a pKa below 0 per gram of zeolite and optionally an ammonium salt under conditions effective to produce a zeolite having a unit cell size in the range of from 24.42 Å to 24.52 Å; a SAR in the range of from 10 to 15; and a surface area of from 910 to 1020 m$^2$/g; and
   d) recovering said zeolite.

2. A process as claimed in claim 1, wherein the intermediate zeolite obtained in step b) is treated with an ammonium salt containing aqueous solution before being contacted with the acidified solution of c).

3. A Process for preparing a hydrocracking catalyst carrier composition, which process comprises:
   (i) preparing a faujasite zeolite by a process as claimed in claim 2, and
   (ii) mixing the zeolite with amorphous binder component.

4. A process for preparing a hydrocracking catalyst composition which process comprises preparing a catalyst carrier composition according to claim 3, and further
   (iii) incorporating at least one hydrogenation component.

5. A process for converting a hydrocarbonaceous feedstock into lower boiling materials, which comprises contacting the feedstock at elevated temperature and pressure with a hydrocracking catalyst composition obtained in a process as claimed in claim 4.

6. A process as claimed in claim 1, wherein the zeolite obtained in step c) is treated with an ammonium salt containing aqueous solution, and optionally washed and dried.

7. A Process for preparing a hydrocracking catalyst carrier composition, which process comprises:
   (i) preparing a faujasite zeolite by a process as claimed in claim 6, and
   (ii) mixing the zeolite with amorphous binder component.

8. A process for preparing a hydrocracking catalyst composition which process comprises preparing a catalyst carrier composition according to claim 7, and further
   (iii) incorporating at least one hydrogenation component.

9. A process for converting a hydrocarbonaceous feedstock into lower boiling materials, which comprises contacting the feedstock at elevated temperature and pressure with a hydrocracking catalyst composition obtained in a process as claimed in claim 8.

10. A process as claimed in any one of claim 1, wherein the amount of acid having a pKa below 0 is of from 5 to 8 mmole per gram of zeolite.

11. A Process for preparing a hydrocracking catalyst carrier composition, which process comprises:
   (i) preparing a faujasite zeolite by a process as claimed in claim 10, and
   (ii) mixing the zeolite with amorphous binder component.

12. A process for preparing a hydrocracking catalyst composition which process comprises preparing a catalyst carrier composition according to claim 11, and further
   (iii) incorporating at least one hydrogenation component.

13. A process for converting a hydrocarbonaceous feedstock into lower boiling materials, which comprises contacting the feedstock at elevated temperature and pressure with a hydrocracking catalyst composition obtained in a process as claimed in claim 12.

14. A process as claimed in any one of claim 1, wherein the pH of the acidified solution is at most 4.

15. A Process for preparing a hydrocracking catalyst carrier composition, which process comprises:
(i) preparing a faujasite zeolite by a process as claimed in claim 14, and
(ii) mixing the zeolite with amorphous binder component.

16. A process for preparing a hydrocracking catalyst composition which process comprises preparing a catalyst carrier composition according to claim 15, and further
(iii) incorporating at least one hydrogenation component.

17. A process for converting a hydrocarbonaceous feedstock into lower boiling materials, which comprises contacting the feedstock at elevated temperature and pressure with a hydrocracking catalyst composition obtained in a process as claimed in claim 16.

18. A process for preparing a hydrocracking catalyst carrier composition, which process comprises:
(i) preparing a faujasite zeolite by a process as claimed in claim 1, and
(ii) mixing the zeolite with amorphous binder component.

19. A process for preparing a hydrocracking catalyst composition which process comprises preparing a catalyst carrier composition according to claim 18, and further
(iii) incorporating at least one hydrogenation component.

20. A process for converting a hydrocarbonaceous feedstock into lower boiling materials, which comprises contacting the feedstock at elevated temperature and pressure with a hydrocracking catalyst composition obtained in a process as claimed in claim 19.

* * * * *